US012803672B2

(12) United States Patent
Mizutani et al.

(10) Patent No.: US 12,803,672 B2
(45) Date of Patent: Nov. 17, 2026

(54) LIGHT MODULE, LIGHT SYSTEM, AND LIGHT OUTPUT METHOD

(71) Applicant: NEC Corporation, Tokyo (JP)

(72) Inventors: Kenji Mizutani, Tokyo (JP); Masaki Oe, Tokyo (JP)

(73) Assignee: NEC CORPORATION, Tokyo (JP)

( * ) Notice: Subject to any disclaimer, the term of this patent is extended or adjusted under 35 U.S.C. 154(b) by 239 days.

(21) Appl. No.: 18/702,047

(22) PCT Filed: Nov. 11, 2021

(86) PCT No.: PCT/JP2021/041585
§ 371 (c)(1),
(2) Date: Apr. 17, 2024

(87) PCT Pub. No.: WO2023/084711
PCT Pub. Date: May 19, 2023

(65) Prior Publication Data
US 2025/0015896 A1 Jan. 9, 2025

(51) Int. Cl.
*H04B 10/50* (2013.01)
*G02F 1/01* (2006.01)
*H04B 10/516* (2013.01)

(52) U.S. Cl.
CPC ......... *H04B 10/506* (2013.01); *G02F 1/0147* (2013.01); *H04B 10/516* (2013.01)

(58) Field of Classification Search
CPC .................................................... H04B 10/506
USPC .......................................................... 398/204
See application file for complete search history.

(56) References Cited

U.S. PATENT DOCUMENTS 7,574,139 B2 * 8/2009 Fu et al. ................. H04J 14/08 398/182
8,059,971 B2 * 11/2011 Mitani et al. .......... H04B 10/00 398/202
11,637,636 B2 * 4/2023 Arikawa et al. ..... H04B 10/613
2003/0184838 A1 * 10/2003 Akiyama et al. ......... G02F 1/01 359/239
2012/0230679 A1 * 9/2012 Hayashi et al. ....... H04B 10/04 398/28
2012/0263202 A1 10/2012 Steinle et al.

FOREIGN PATENT DOCUMENTS

JP 2006-100414 A 4/2006
JP 2006-245346 A 9/2006
JP 2010-093677 A 4/2010
JP 2016-102926 A 6/2016
JP 2019-503080 A 1/2019
(Continued)

OTHER PUBLICATIONS

International Search Report for PCT Application No. PCT/JP2021/041585, mailed on Jan. 25, 2022.
(Continued)

*Primary Examiner* — Kenneth N Vanderpuye

(57) ABSTRACT

A light module (1), in order to adjust the phase of light using a simple configuration, comprises: a light outputting means (20) for outputting light; a phase control means (17) for adjusting the phase of the light; and a detection means (16) for detecting the intensity of the light. The phase control means (17) adjusts the phase of the light on the basis of the intensity.

15 Claims, 13 Drawing Sheets

(56) References Cited

FOREIGN PATENT DOCUMENTS

| | | | |
|---|---|---|---|
| JP | 2019-040099 | A | 3/2019 |
| JP | 2019-140183 | A | 8/2019 |
| JP | 2021-158267 | A | 10/2021 |

OTHER PUBLICATIONS

English translation of Written opinion for PCT Application No. PCT/JP2021/041585, mailed on Jan. 25, 2022.

JP Office Action for JP Application No. 2023-559322, mailed on Apr. 22, 2025 with English Translation.

* cited by examiner

Fig.7

| | FIRST WAVELENGTH | SECOND WAVELENGTH |
|---|---|---|
| SUPPLY AMOUNT | 3mw | 5mw |
| AVERAGE VALUE | 3mw | 5mw |
| MAXIMUM VALUE | 3. 1mw | 5. 1mw |
| MINIMUM VALUE | 2. 9mw | 4. 9mw |

Fig.10

| | FIRST WAVELENGTH | SECOND WAVELENGTH |
|---|---|---|
| SUPPLY AMOUNT | 3. 1mw | 5. 1mw |
| AVERAGE VALUE | 3. 1mw | 5mw |
| MAXIMUM VALUE | 3. 2mw | 5. 1mw |
| MINIMUM VALUE | 3. 0mw | 4. 9mw |

LIGHT MODULE, LIGHT SYSTEM, AND LIGHT OUTPUT METHOD

This application is a National Stage Entry of PCT/JP2021/041585 filed on Nov. 11, 2021, the contents of all of which are incorporated herein by reference, in their entirety.

TECHNICAL FIELD

The present invention relates to, for example, a light module and the like capable of adjusting a phase of light with a simple configuration.

BACKGROUND ART

In an optical transceiver, there is a case, in order to output light of a predetermined wavelength, in which an amplified spontaneous emission (ASE) being output from an optical amplifier such as a semiconductor optical amplifier (SOA) is transmitted through a wavelength filter such as a ring resonator. For example, in a related wavelength variable light source described in PTL 1, a semiconductor optical amplifier is hybrid-mounted on a silicon substrate on which an optical waveguide device is integrated. The optical waveguide device includes a waveguide type wavelength filter using two ring resonators, a phase adjuster, and a partially reflective mirror. Further, a laser resonator is configured to be formed by a path passing through the semiconductor optical amplifier, the waveguide type wavelength filter, and the partially reflective mirror.

At this occasion, generally, in order to adjust a phase of light transmitted through the wavelength filter, it is known that the light is modulated by using a low-frequency electrical signal called a dither signal. Since an oscillation frequency constantly moves by a low-frequency signal, signal deterioration due to stimulated brilliant scattering in optical fiber communication can also be suppressed.

In addition, a related technique is disclosed in PTLs 2, 3, and 4.

CITATION LIST

Patent Literature

PTL 1: Japanese Unexamined Patent Application Publication No. 2019-040099

PTL 2: Japanese Unexamined Patent Application Publication No. 2006-245346

PTL 3: Japanese Unexamined Patent Application Publication No. 2016-102926

PTL 4: Japanese Unexamined Patent Application Publication (Translation of PCT Application) No. JP-T-2019-503080

SUMMARY OF INVENTION

Technical Problem

However, in a general configuration using a dither signal as described above, a control circuit for modulation is required, and a problem such that a configuration becomes complicated has been involved.

An object of the present invention is to provide a light module and the like capable of adjusting a phase of light with a simple configuration.

Solution to Problem

In the present invention, a light module includes:

a light output means for outputting light;

a phase control means for adjusting a phase of the light; and a detection means for detecting intensity of the light, in which the phase control means adjusts a phase of the light, based on the intensity.

Further, in the present invention, a light system includes:

a light output means for outputting light;

a phase control means for adjusting a phase of the light; and a detection means for detecting intensity of the light, in which the phase control means adjusts a phase of the light, based on the intensity.

Further, in the present invention, a light output method includes:

outputting light;

detecting intensity of the light; and adjusting a phase of the light, based on the intensity.

Advantageous Effects of Invention

The present invention is able to adjust a phase of light with a simple configuration.

BRIEF DESCRIPTION OF DRAWINGS

FIG. 7 is a diagram for describing details of the light module according to the second example embodiment of the present invention.

FIG. 10 is a diagram for describing a modification example of an operation of the light module according to the second example embodiment of the present invention.

EXAMPLE EMBODIMENT

First Example Embodiment

Figure 1:
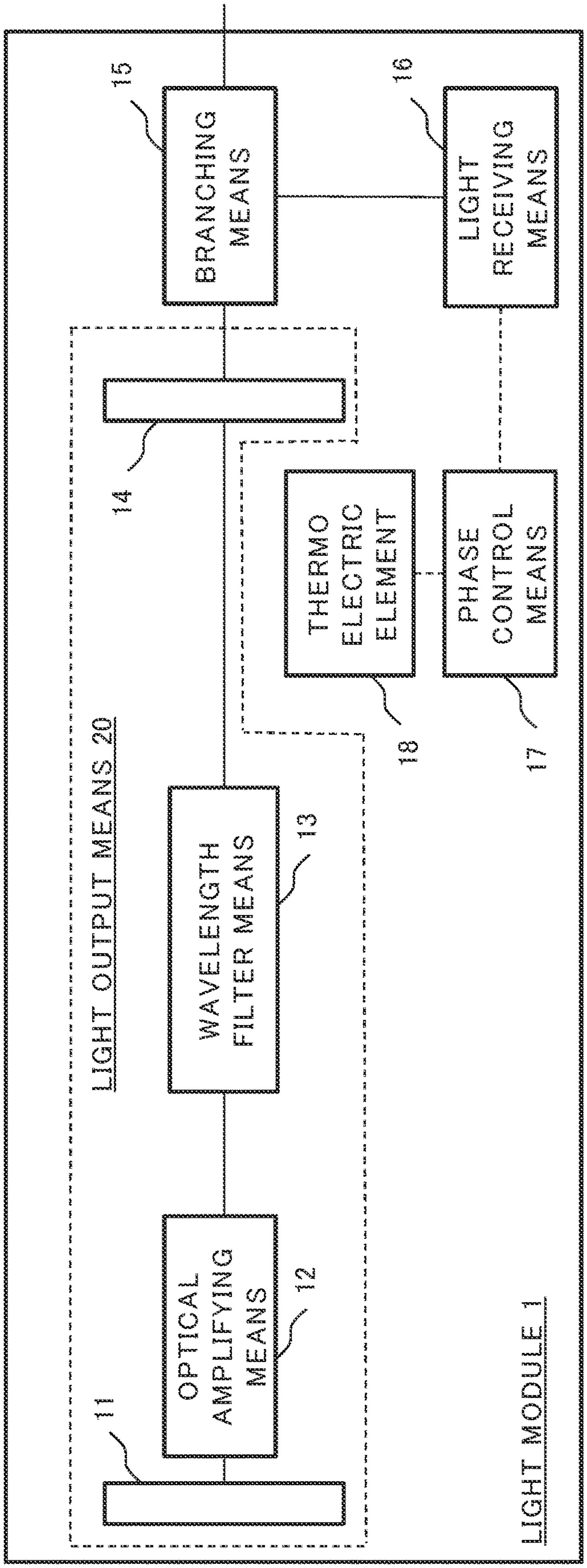
FIG. 1 is a block diagram illustrating a configuration example of a light module according to a first example embodiment of the present invention.
Figure 2:
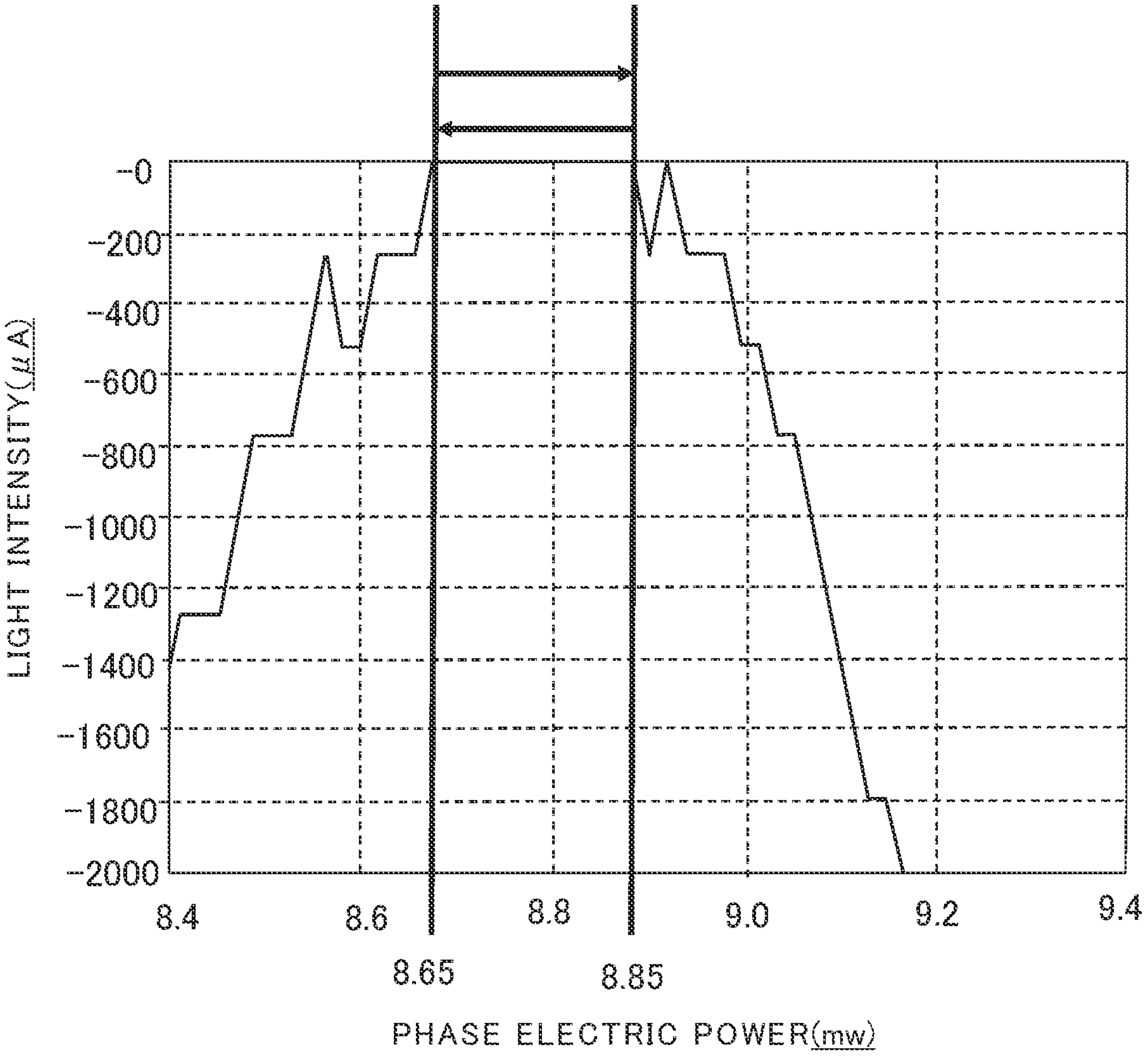
FIG. 2 is a diagram for describing details of the light module according to the first example embodiment of the present invention.
Figure 3:
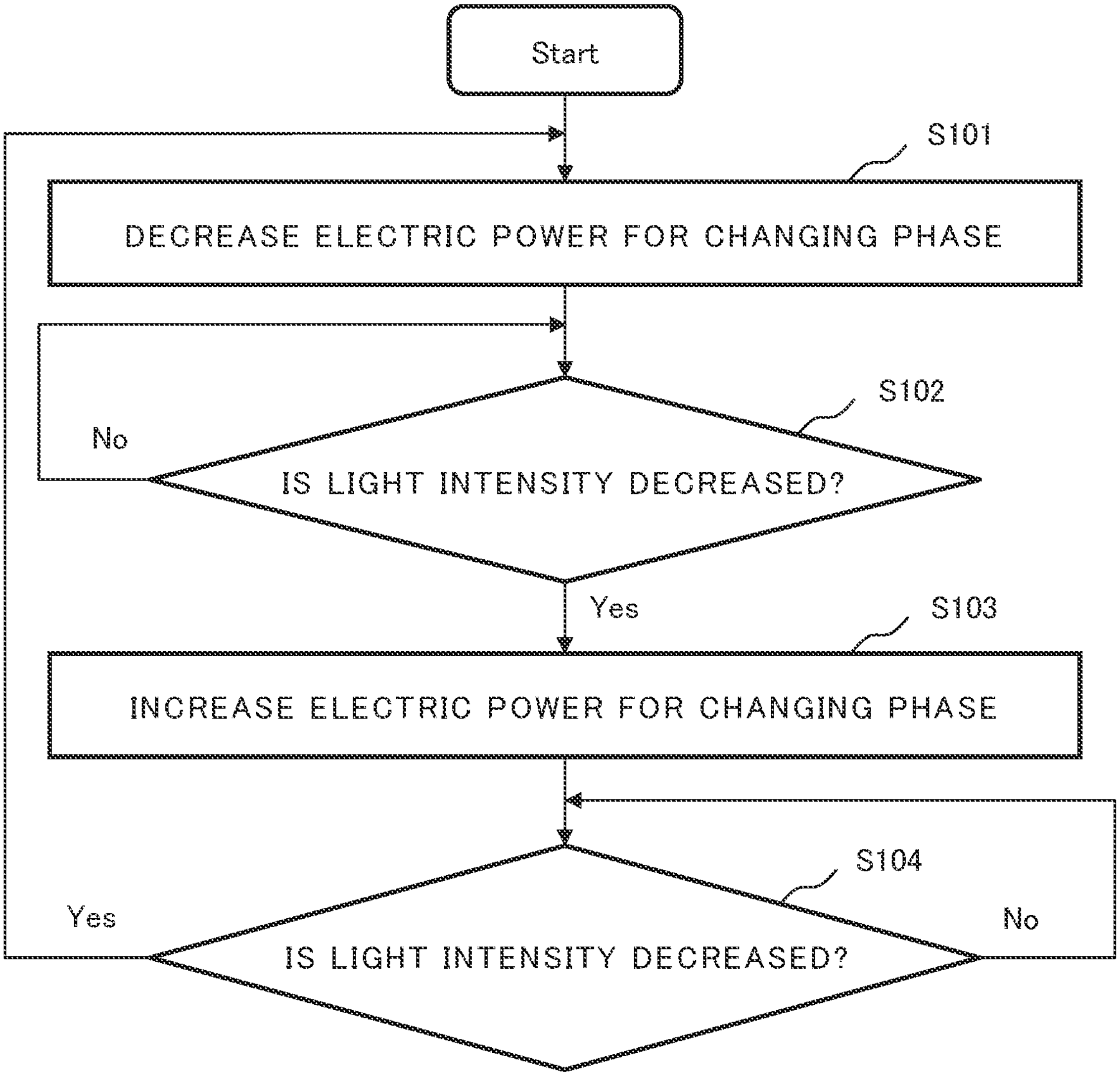
FIG. 3 is a flowchart illustrating an operation example of the light module according to the first example embodiment of the present invention.

A light module 1 according to a first example embodiment is described based on FIGS. 1, 2 and 3. FIG. 1 is a block diagram illustrating a configuration example of the light module 1. FIG. 2 is a diagram for describing details of the light module 1. FIG. 3 is a flowchart diagram for describing an operation example of the light module 1.

As illustrated in FIG. 1, the light module 1 includes a reflective means 11, an optical amplifying means 12, a wavelength filter means 13, a partially reflective means 14, a branching means 15 and a light receiving means 16, and a phase control means 17 and a thermoelectric element 18. The reflective means 11, the optical amplifying means 12, the wavelength filter means 13, and the partially reflective means 14 are included in a light output means 20. The light module 1 is, for example, a light source provided in an optical transceiver or the like. For example, the light module 1 can be configured as a transmission light source by modulating light to be output from the branching means 15 of the light module 1 by a modulator (not illustrated in FIG. 1). In FIG. 1, a solid line connecting between components indicates an optical path, and a dotted line connecting between components indicates an electrical connection relationship.

The reflective means 11 is optically connected to the optical amplifying means 12. The reflective means 11 is a mirror for reflecting light incident from the optical amplifying means 12 toward the optical amplifying means 12. The reflective means 11 is formed, for example, of a high reflective film.

The optical amplifying means 12 is optically connected to the reflective means 11 and the wavelength filter means 13. The optical amplifying means 12 outputs light toward the reflective means 11 and the wavelength filter means 13. The optical amplifying means 12 is, for example, an optical amplifier for outputting ASE light of a broadband. The optical amplifying means 12 is, for example, an SOA.

The wavelength filter means 13 is optically connected to the optical amplifying means 12 and the partially reflective means 14. The wavelength filter means 13 transmits only light of a part of a wavelength among a wavelength of light to be incident from the optical amplifying means 12 or the partially reflective means 14. For example, the wavelength filter means 13 transmits light having a wavelength of 1550 nm. The wavelength filter means 13 is, for example, a wavelength filter such as a ring resonator. The wavelength filter means 13 may be configured of, for example, a plurality of ring resonators.

The partially reflective means 14 is optically connected to the wavelength filter means 13 and the branching means 15. The partially reflective means 14 reflects a part of light transmitted through and incident on the wavelength filter means 13, and transmits another part of the light toward the branching means 15. Light reflected on the partially reflective means 14 propagates toward the reflective means 11. Thus, only light of a wavelength selected by the wavelength filter means 13 is amplified between the reflective means 11 and the partially reflective means 14, and laser-oscillated.

The branching means 15 is optically connected to the partially reflective means 14, the light receiving means 16, and a modulator (not illustrated) outside of the light module 1. The branching means 15 splits light transmitted through the partially reflective means 14. One component of the light split by the branching means 15 is output to the outside of the light module 1. Further, the other component of the light split by the branching means 15 is output to the light receiving means 16. The branching means 15 is, for example, 1-input/2-output waveguide.

The light receiving means 16 is optically connected to the branching means 15, and electrically connected to the phase control means 17. The light receiving means 16 receives the other component of the light split by the branching means 15. The light receiving means 16 detects intensity of the received light, and outputs to the phase control means 17. The light receiving means 16 is, for example, a photodiode. The light receiving means 16 is equivalent to a detection means.

The phase control means 17 is electrically connected to the light receiving means 16 and the thermoelectric element 18. The phase control means 17 adjusts a phase of light output from the wavelength filter means 13. For example, the phase control means 17 changes electric power to be given to the thermoelectric element 18 provided near a waveguide through which light output from the wavelength filter means 13 propagates, and changes a temperature in the waveguide. The thermoelectric element 18 is, for example, a heater electrode. Further, the thermoelectric element 18 is thermally connected to the waveguide through which light output from the wavelength filter means 13 propagates. This allows the phase control means 17 to change a refractive index of a part of the waveguide through which light output from the wavelength filter means 13 propagates by applying heat, and change a phase of light propagating through the waveguide. The example embodiment is not limited thereto, and the phase control means 17 may control a refractive index of a waveguide by injecting electric current to a part of the waveguide.

Next, details of the phase control means 17 are described by using FIG. 2. FIG. 2 is a diagram illustrating a relationship between phase electric power to be controlled by the phase control means 17, and electric current according to intensity of light to be detected by the light receiving means 16. The above-described phase electric power is electric power to be used for controlling a phase of light propagating through a waveguide by the phase control means 17. More specifically, the phase electric power designates electric power to be supplied to the thermoelectric element 18 provided near a waveguide to adjust a temperature in the waveguide through which light output from the wavelength filter means 13 propagates.

The phase control means 17 is executable by switching between first control of raising a temperature in a waveguide through which light output from the wavelength filter means 13 propagates, and second control of lowering a temperature in the waveguide. In the following example, it is assumed that the phase control means 17 performs the first control by increasing phase electric power to be supplied to the thermoelectric element 18, and performs the second control by decreasing phase electric power to be supplied to the thermoelectric element 18. In this case, an arrow extending from left toward right in FIG. 2 is equivalent to the first control. Further, an arrow extending from right to left in FIG. 2 is equivalent to the second control. The phase control means 17 performs each of the first control and the second control, while maintaining light intensity by operating along a flowchart to be described later. Note that, the phase control means 17 may perform the first control by decreasing phase electric power to be supplied to the thermoelectric element

18, and perform the second control by increasing phase electric power to be supplied to the thermoelectric element 18.

Next, an operation of the light module 1 is described by using FIGS. 2 and 3. FIG. 3 is a flowchart illustrating an operation of the light module 1. It is assumed that, at a start point of time of an operation illustrated in FIG. 3, light from the partially reflective means 14 transmits by outputting light by the optical amplifying means 12. Further, it is assumed that, at a start point of time of an operation of the light module 1, a user of the light module 1 recognizes in advance phase electric power for setting light intensity to a predetermined target value or more. For example, in the example in FIG. 2, a user recognizes that light intensity becomes maximum, when phase electric power is 8.65 mw or more and 8.85 mw or less. Thus, it is assumed that the phase control means 17 of the light module 1 supplies, to the thermoelectric element 18, phase electric power of 8.65 mw or more and 8.85 mw or less at a start point of time of an operation.

The phase control means 17 decreases electric power (phase electric power) for changing a phase (S101). By processing in S101, the phase control means 17 performs the above-described second control of lowering a temperature in a waveguide through which light output from the wavelength filter means 13 propagates. For example, in the example in FIG. 2, the phase control means 17 sequentially changes phase electric power by every 0.025 mw. Note that, an increase amount of phase electric power is not limited to 0.025 mw. For example, in the example in FIG. 2, the phase control means 17 decreases phase electric power from 8.65 mw to 8.625 mw.

Further, the phase control means 17 determines whether the light intensity is decreased (S102). When it is determined that the light intensity is decreased (Yes in S102), the phase control means 17 performs processing in S103 to be described later. On the other hand, when it is not determined that the light intensity is decreased (No in S102), the phase control means 17 performs processing in S102 again. Specifically, the phase control means 17 repeatedly determines whether the light intensity is decreased, while continuing to decrease phase electric power until it is determined that the light intensity is decreased. For example, in the example in FIG. 2, the phase control means 17 determines that the light intensity is decreased, when phase electric power is decreased from 8.65 mw to 8.625 mw.

The phase control means 17 increases electric power (phase electric power) for changing a phase (S103). By processing in S103, the phase control means 17 performs the above-described first control of raising a temperature in a waveguide through which light output from the wavelength filter means 13 propagates. For example, in the example in FIG. 2, the phase control means 17 detects that the light intensity is decreased, when phase electric power is decreased from 8.65 mw to 8.625 mw, and increases phase electric power from 8.625 mw to 8.65 mw. This allows the phase control means 17 to change phase electric power, while maintaining in such a way that the light intensity becomes maximum.

Further, the phase control means 17 determines whether the light intensity is decreased (S104). When it is determined that the light intensity is decreased (Yes in S104), the phase control means 17 performs processing in S101. On the other hand, when it is not determined that the light intensity is decreased (No in S104), the phase control means 17 performs processing in S104 again. Specifically, the phase control means 17 repeatedly determines whether the light intensity is decreased, while continuing to increase phase electric power until it is determined that the light intensity is decreased. For example, in the example in FIG. 2, the phase control means 17 decreases phase electric power from 8.875 mw to 8.85 mw in response to a decrease in the light intensity, when phase electric power is increased from 8.85 mw to 8.875 mw. In this way, since the phase control means 17 in the light module 1 changes phase electric power until the light intensity is lowered, electric energy of phase electric power at which a light output constantly becomes maximum can be recognized by detecting an amplitude range of phase electric power.

For example, when the phase control means 17 accepts an instruction to stop from another external device, the phase control means 17 finishes the operation illustrated in FIG. 3. The light module 1 repeatedly operates pieces of processing in S101, S102, S103, and S104 until the operation is finished. Specifically, the phase control means 17 performs the first control (S103) of raising a temperature in a waveguide through which light propagates, and the second control (S101) of lowering a temperature in the waveguide. Further, the phase control means 17 performs one of the first control and the second control, and when light intensity is decreased, the phase control means 17 performs the other of the first control and the second control.

This allows the light module 1 to maintain intensity of light to be transmitted from the partially reflective means 14. For example, in the light module 1, there is a case where a temperature of a thermoelectric element provided for the wavelength filter means 13 is changed to control a wavelength of light to be transmitted through the wavelength filter means 13. In this case, the above-described relationship between phase electric power and light intensity as illustrated in FIG. 2 may change due to heat from the thermoelectric element provided for the wavelength filter means 13. In this case, when phase electric power is made constant, the light intensity becomes unstable. However, in the light module 1, when light intensity is decreased, one of the first control and the second control is switched to the other. Therefore, according to the light module 1, even when the above-described relationship between phase electric power and light intensity changes, the light intensity can be stabilized.

Further, in the light module 1, the phase control means 17 adjusts a phase of light, based on intensity of light detected by the light receiving means 16. Therefore, in the light module 1, since it is not necessary to adjust a phase of light by using a dither signal, the phase of light can be adjusted with a simple configuration.

Figure 4:
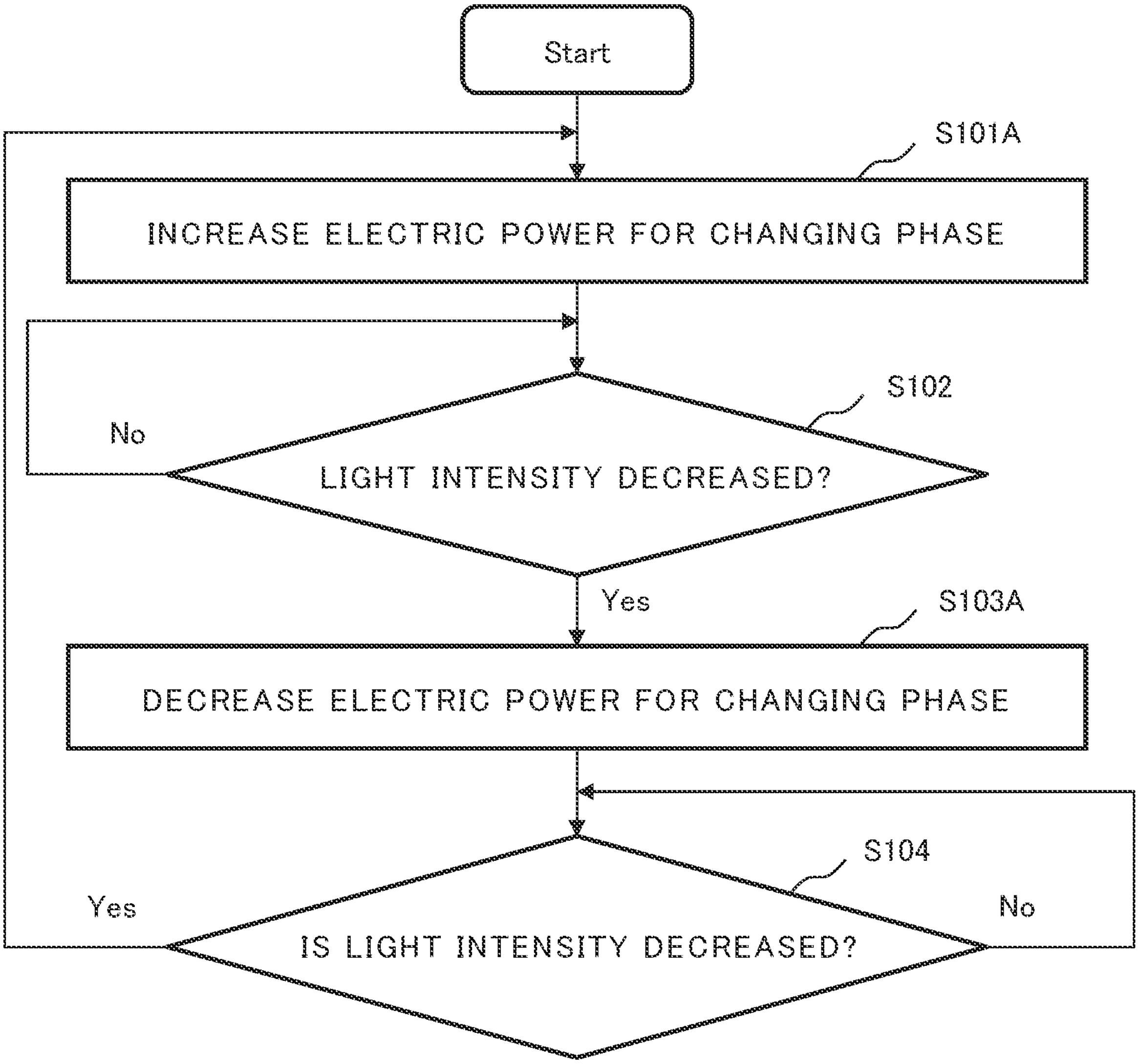
FIG. 4 is a block diagram illustrating a modification example of a configuration of the light module according to the first example embodiment of the present invention.

Next, a light module 1A is described by using FIG. 4. The light module 1A is a first modification example of the light module 1. The light module 1A includes, similarly to the light module 1, a reflective means 11, an optical amplifying means 12, a wavelength filter means 13, a partially reflective means 14, a branching means 15 and a light receiving means 16, and a phase control means 17 and a thermoelectric element 18.

The light module 1A is different from the light module 1 in a part of an operation. FIG. 4 is a flowchart illustrating an operation of the light module 1A. Specifically, the light module 1A performs processing in S101A to be described later, in place of processing in S101, and performs processing in S103A to be described later, in place of processing in S103.

Specifically, in the light module 1A, the phase control means 17 increases electric power (phase electric power) for changing a phase (S101A). For example, the phase control means 17 sequentially increases phase electric power by every 0.025 mw. Note that, an increase amount of phase electric power is not limited to 0.025 mw. By processing in S101A, the phase control means 17 performs the above-described first control of raising a temperature in a waveguide through which light output from the wavelength filter means 13 propagates.

Further, in the light module 1A, the phase control means 17 decreases electric power (phase electric power) for changing a phase (S103A). By processing in S103A, the phase control means 17 performs the above-described second control of lowering a temperature in the waveguide through which light output from the wavelength filter means 13 propagates. This allows the phase control means 17 to change phase electric power, while maintaining the light intensity maximum.

Figure 5:
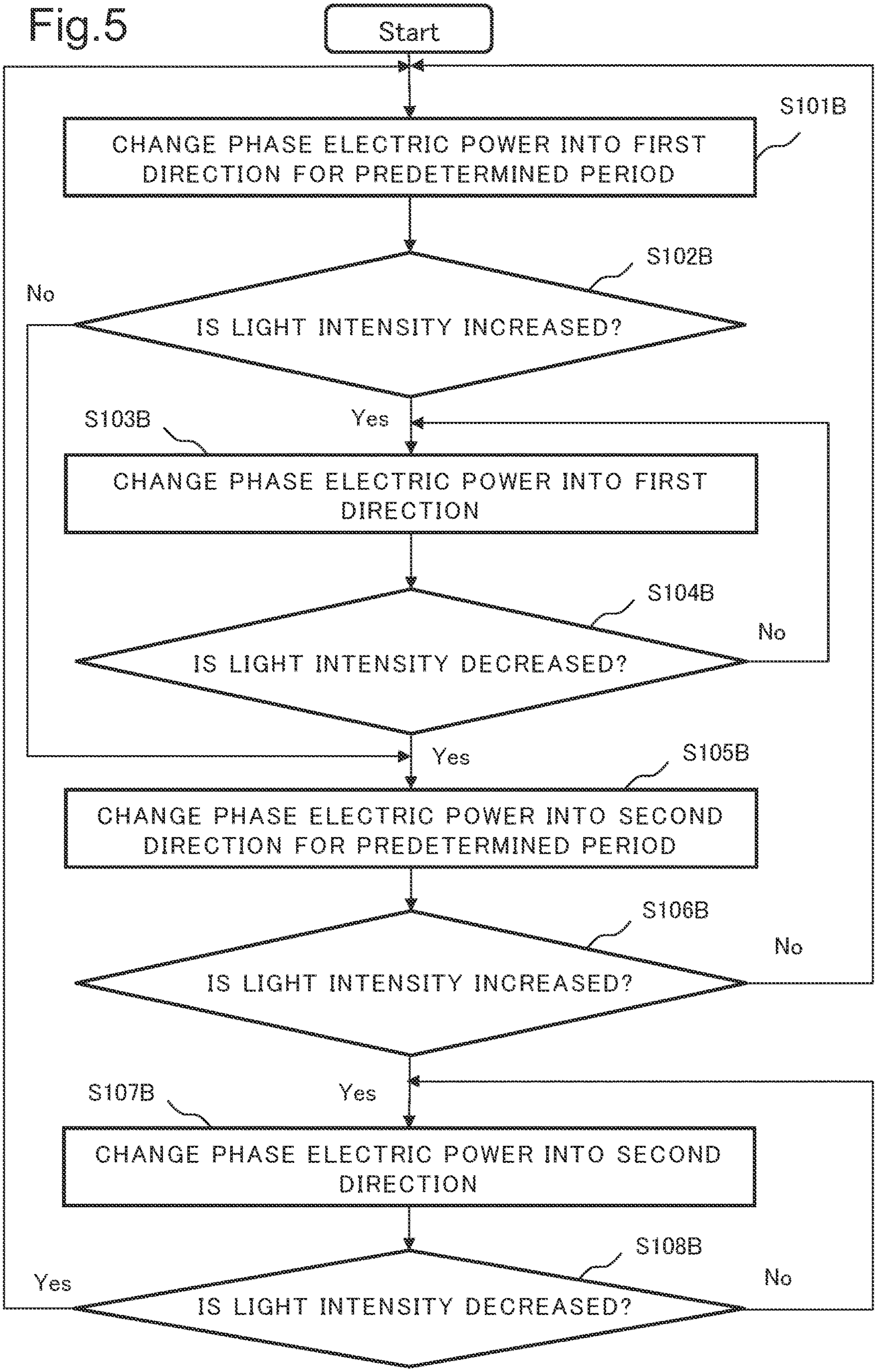
FIG. 5 is a flowchart illustrating a modification example of an operation of the light module according to the first example embodiment of the present invention.

Next, a light module 1B is described by using FIG. 5. The light module 1B is a second modification example of the light module 1. The light module 1B includes, similarly to the light module 1, a reflective means 11, an optical amplifying means 12, a wavelength filter means 13, a partially reflective means 14, a branching means 15 and a light receiving means 16, and a phase control means 17 and a thermoelectric element 18.

The light module 1B is different from the light module 1 in an operation. FIG. 5 is a flowchart illustrating an operation of the light module 1B. Specifically, the light module 1B performs pieces of processing in S101B to S108B to be described later. Note that, it is assumed that, at a start point of time of an operation of the light module 1B, the phase control means 17 recognizes a relationship between phase electric power and light intensity. Specifically, the phase control means 17 supplies phase electric power of a predetermined value, and then, changes a value of phase electric power from the predetermined value in a plus direction and a minus direction. Changing phase electric power in a plus direction designates that phase electric power is increased. Further, changing phase electric power in a minus direction designates that phase electric power is decreased. The phase control means 17 acquires, from the light receiving means 16, light intensity when phase electric power is changed in both of the directions. This allows the phase control means 17 to determine a direction in which light intensity is increased between a plus direction and a minus direction, based on a change in the light intensity. In the following description on the operation, it is assumed that the plus direction is a first direction in which light intensity is increased. Further, it is assumed that the minus direction is a second direction. Note that, the above-described description is an example, and the minus direction may be the first direction in which light intensity is increased. In this case, the plus direction is the second direction.

The phase control means 17 changes phase electric power in the first direction during a predetermined period (S101B). The phase control means 17 determines whether the light intensity is increased (S102B). Specifically, the phase control means 17 determines whether light intensity detected after processing in S101B is performed is increased, as compared with light intensity detected before processing in S102B is performed. When it is determined that the light intensity is increased (Yes in S102B), the phase control means 17 performs processing in S103B to be described later. Further, when it is not determined that the light intensity is increased (No in S102B), the phase control means 17 performs processing in S105B to be described later.

The phase control means 17 changes phase electric power in the first direction (S103B). For example, the phase control means 17 increases phase electric power by 0.025 mw. Note that, in the above-described S101B, it is assumed that the phase control means 17 increases phase electric power by an amount larger than an increase amount in S103B. Processing in S103B is equivalent to the above-described first control.

The phase control means 17 determines whether the light intensity is decreased (S104B). Specifically, the phase control means 17 determines whether the light intensity detected after processing in S103B is performed is decreased, as compared with the light intensity detected before processing in S103B is performed. When it is determined that the light intensity is decreased (Yes in S104B), the phase control means 17 performs processing in S105B to be described later. Further, when it is not determined that the light intensity is decreased (Yes in S104B), the phase control means 17 performs processing in S103B again.

The phase control means 17 changes phase electric power in the second direction during a predetermined period (S105B). The phase control means 17 determines whether the light intensity is increased (S106B). Specifically, the phase control means 17 determines whether light intensity detected after processing in S105B is performed is increased, as compared with light intensity detected before processing in S105B is performed. When it is determined that the light intensity is increased (Yes in S106B), the phase control means 17 performs processing in S107B to be described later. Further, when it is not determined that the light intensity is increased (No in S106B), the phase control means 17 performs processing in S101B again.

The phase control means 17 changes phase electric power in the second direction (S107B). For example, the phase control means 17 decreases phase electric power by 0.025 mw. Note that, in the above-described S105B, it is assumed that the phase control means 17 decreases phase electric power by an amount larger than the decrease amount in S107B. Control in S107B is equivalent to the second control.

The phase control means 17 determines whether the light intensity is decreased (S108B). Specifically, the phase control means 17 determines whether the light intensity detected after processing in S107B is performed is decreased, as compared with the light intensity detected before processing in S107B is performed. When it is determined that the light intensity is decreased (Yes in S108B), the phase control means 17 performs processing in S101 again. Further, when it is not determined that the light intensity is decreased (No in S108B), the phase control means 17 performs processing in S107B again.

In the foregoing, modification examples of the light module 1 have been described. In any of the modification examples, the phase control means 17 adjusts a phase of light, based on intensity of light detected by the light receiving means 16. Therefore, also in the modification examples of the light module 1, since it is not necessary to adjust a phase of light by using a dither signal, the phase of light can be adjusted with a simple configuration.

Further, in the light module 1, and the modification examples of the light module 1, each constituent element does not have to be provided as one module. Each constituent element may be achieved as a light system, after being provided at a different position. For example, in the light module 1, the light receiving means 16 and the phase control means 17 may be provided at a position away from another component.

Second Example Embodiment

Figure 6:
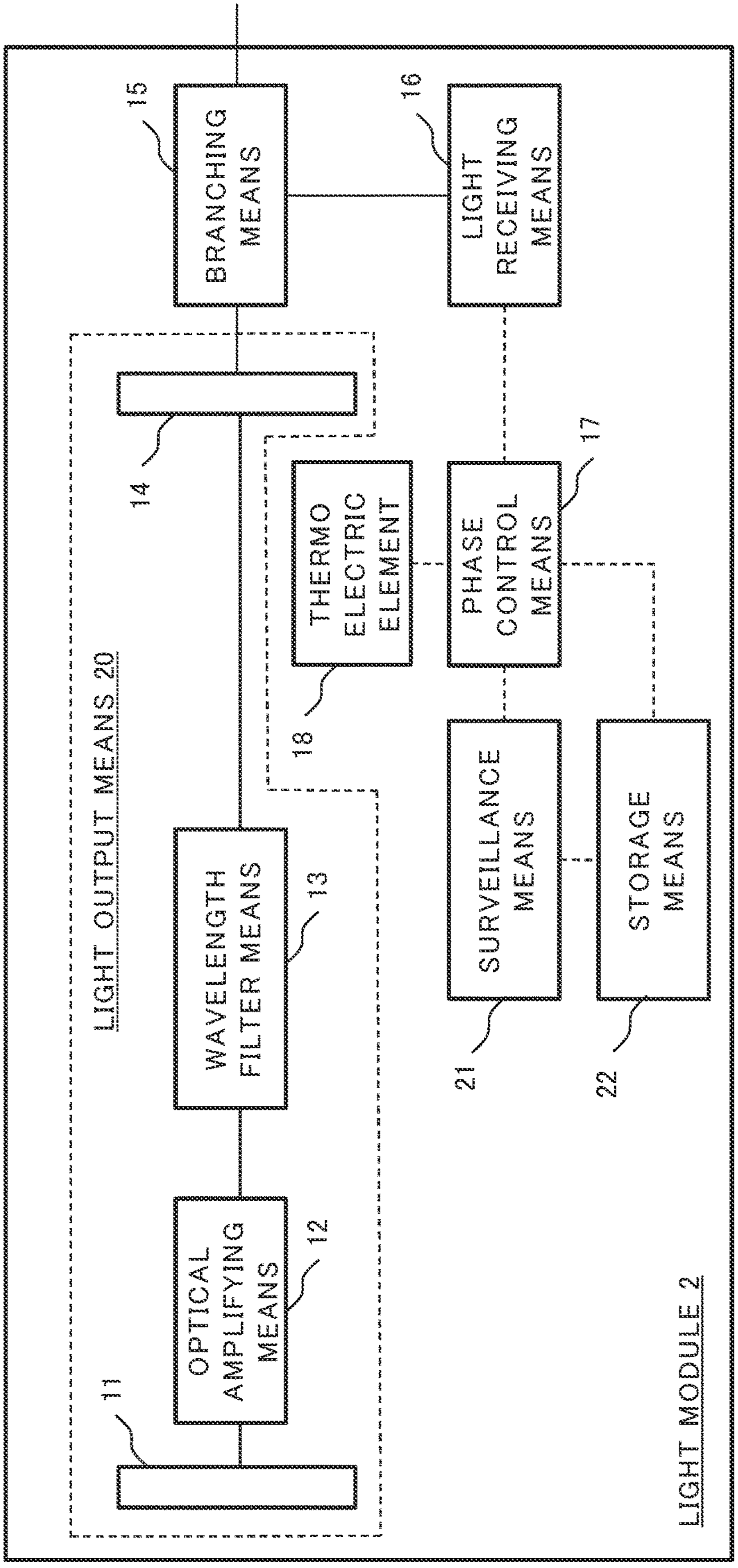
FIG. 6 is a block diagram illustrating a configuration example of a light module according to a second example embodiment of the present invention.

A light module 2 according to a second example embodiment is described based on FIGS. 6 and 7. FIG. 6 is a block diagram illustrating a configuration example of the light module 2. FIG. 7 is a flowchart diagram for describing an operation example of the light module 2.

Similarly to the light module 1, as illustrated in FIG. 6, the light module 2 includes a reflective means 11, an optical amplifying means 12, a wavelength filter means 13, a partially reflective means 14, a branching means 15 and a light receiving means 16, and a phase control means 17 and a thermoelectric element 18. The reflective means 11, the optical amplifying means 12, the wavelength filter means 13, and the partially reflective means 14 are included in a light output means 20. The light module 2 is, for example, a light source provided in an optical transceiver or the like. For example, the light module 2 can be configured as a transmission light source by modulating light to be output from the light module 2 by a modulator. A solid line connecting between constituent elements in FIG. 6 indicates an optical path, and a dotted line connecting between constituent elements indicates an electrical connection relationship.

Note that, in FIG. 6, a reference sign equivalent to a reference sign illustrated in FIG. 1 is attached to a constituent element equivalent to each constituent element illustrated in FIG. 1. Further, the light module 2 is different from the light module 1 in a point that the light module 2 includes a surveillance means 21 and a storage means 22.

The surveillance means 21 is electrically connected to the storage means 22 and the phase control means 17. The surveillance means 21 surveys electric energy of electric power (phase electric power) to be supplied from the phase control means 17 to the thermoelectric element 18. Specifically, the surveillance means 21 surveys electric energy of phase electric power to be supplied from the phase control means 17 to the thermoelectric element 18 during a time when the phase control means 17 performs at least one of first control as described in the above-described S107, and second control as described in the above-described S105. At this occasion, the surveillance means 21 monitors information on current phase electric energy regarding a specific wavelength channel, and notifies the storage means 22 of a change in phase electric energy caused by deterioration over time, or the like. The wavelength channel designates, for example, a plurality of conditions standardized by the international telecommunication union (ITU) or the like, and causing light to oscillate at a specific wavelength.

The storage means 22 is electrically connected to the surveillance means 21 and the phase control means 17. Further, the storage means 22 stores first electric energy associated with a first wavelength, and second electric energy associated with a second wavelength. The first wavelength and the second wavelength are a wavelength of light being able to be output from the light output means 20. The first wavelength and the second wavelength are wavelengths different from each other. Specifically, the first wavelength and the second wavelength designate a wavelength of light transmissible through the wavelength filter means 13. Since the wavelength filter means 13 is an optical filter in which a transmission wavelength is variable, for example, the wavelength filter means 13 can switch a wavelength of light to be output from the light output means 20 from the first wavelength to the second wavelength by changing a temperature of the wavelength filter means 13 itself. In optical communication, a wavelength at a frequency interval standardized by the ITU is used, and, for example, the second wavelength becomes a wavelength deviated by an integer multiple of 100 GHz from the first wavelength.

Further, the first electric energy is phase electric power associated with the first wavelength. More specifically, the first electric energy is phase electric power for maximizing light intensity of light to be received by the light receiving means 16, when light of the first wavelength is output from the light output means 20. Further, the second electric energy is phase electric power associated with the second wavelength. More specifically, the second electric energy is phase electric power for maximizing light intensity of light to be received by the light receiving means 16, when light of the second wavelength is output from the light output means 20. Regarding the first electric energy and the second electric energy, a condition (initial condition) confirmed at a shipment time of a module is stored in the storage means 22.

The surveillance means 21 acquires electric energy of phase electric power to be supplied from the phase control means 17 to the thermoelectric element 18, when the phase control means 17 performs the first control and the second control. For example, the surveillance means 21 acquires an average value of phase electric power supplied to the thermoelectric element 18 in a condition in which light output (the above-described light intensity) becomes maximum during a time when the phase control means 17 performs the first control and the second control. The surveillance means 21 stores, in the storage means 22, the acquired average value of phase electric power, as first electric power, in association with the first wavelength.

Information to be stored in the storage means 22 is described based on FIG. 7. FIG. 7 is one example of information to be stored in the storage means 22 by the surveillance means 21. As illustrated in FIG. 7, the surveillance means 21 may store, in addition to an average value being first electric power, a maximum value of phase electric power and a minimum value of phase electric power in the storage means 22. Further, the surveillance means 21 also stores, in the storage means 22, an average value, as a supply amount. The phase control means 17 can supply, to the thermoelectric element 18, phase electric power for causing light having optimum light intensity to be output from the light output means 20 by referring to a value of the supply amount in the storage means 22, when supply of phase electric power to the thermoelectric element 18 is started. Further, similarly to phase electric power when light of the first wavelength is output, the surveillance means 21 acquires an average value, a maximum value, a minimum value, and a supply amount of phase electric power when light of the second wavelength is output.

Figure 8:
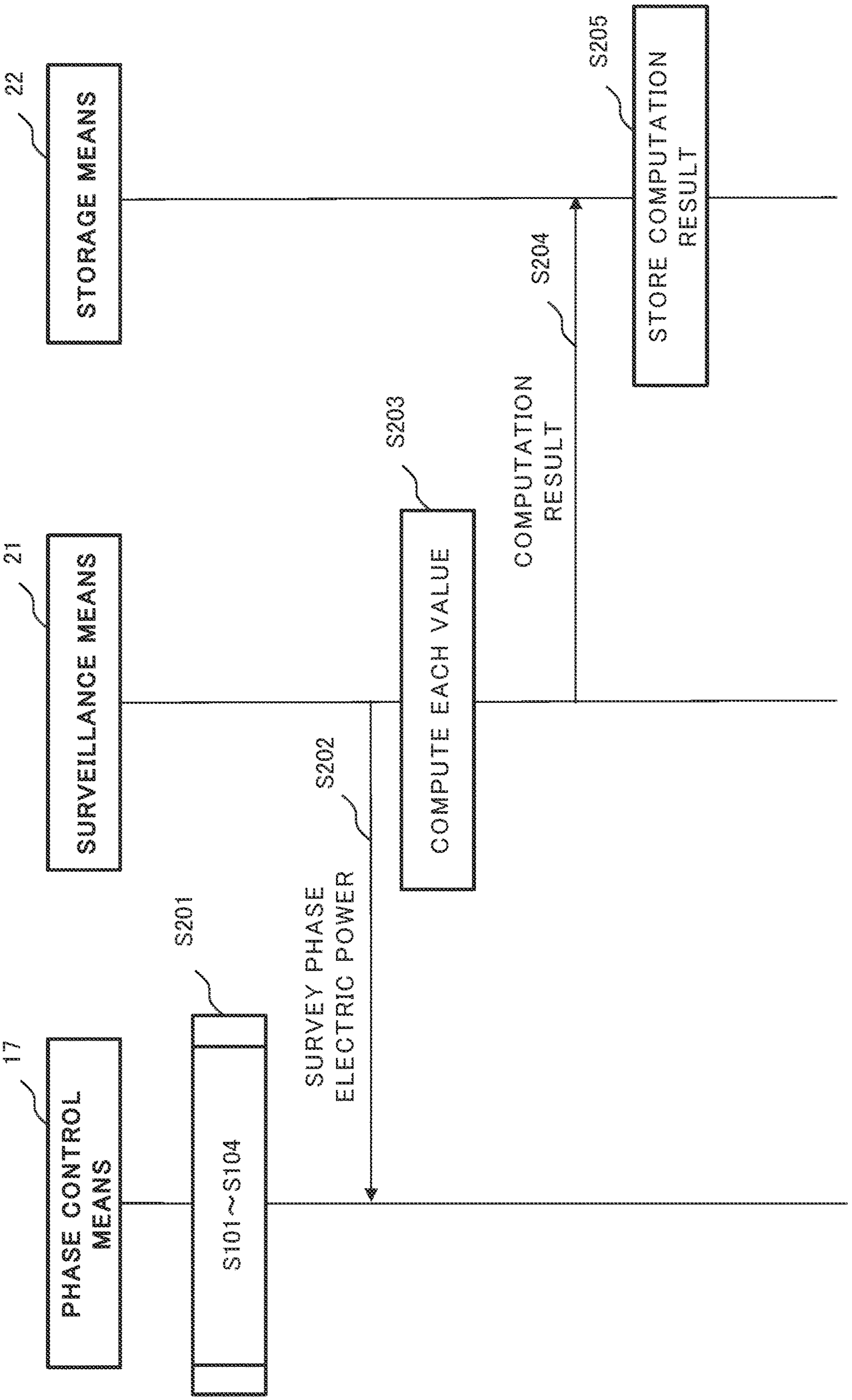
FIG. 8 is a flowchart illustrating an operation example of the light module according to the second example embodiment of the present invention.

Next, an operation for acquiring information illustrated in FIG. 7 by the storage means 22 is described by using FIG. 8. The light module 2 repeats pieces of processing in S101 to S104 in the light module 1 (S201). Note that, in processing in S201, the light module 2 may repeat pieces of processing in S101 to S104 in the light module 1A. Further, in processing in S201, the light module 2 may repeat pieces of processing in S101B to S108B in the light module 1B.

The surveillance means 21 surveys phase electric power being supplied to the thermoelectric element 18 (S202). This allows the surveillance means 21 to acquire electric energy of phase electric power being supplied to the thermoelectric element 18 during a time when processing in S201 is performed by the phase control means 17.

The surveillance means 21 computes each value, based on the acquired electric energy (S203). Specifically, the surveillance means 21 computes a maximum value, a minimum value, and an average value of the acquired electric energy of phase electric power.

The surveillance means 21 outputs a computation result to the storage means 22 (S204). The storage means 22 stores the computation result (S205). This allows the storage means 22 to acquire an average value, a maximum value, and a minimum value of phase electric power with respect to the first wavelength or the second wavelength in FIG. 7.

In this way, in the light module 2, the surveillance means 21 surveys electric energy of electric power (phase electric power) to be supplied to the thermoelectric element 18 during a time when the phase control means 17 performs at least one of the first control and the second control. Therefore, for example, even when the light module 2 stops the operation, and is activated again, the phase control means 17 can adjust a phase of light by appropriate electric energy immediately after re-activation by using electric energy (e.g., an average value) surveyed by the surveillance means 21 without using inappropriate phase electric power.

Further, also in the light module 2, the phase control means 17 adjusts a phase of light, based on intensity of light detected by the light receiving means 16. Therefore, also in the light module 2, since it is not necessary to adjust a phase of light by using a dither signal, a phase of light can be adjusted with a simple configuration.

Further, also in the light module 2, when intensity of light is decreased, one of the first control and the second control is switched to the other. Therefore, according to the light module 2, even when the above-described relationship between phase electric power and light intensity changes, intensity of light can be stabilized.

Next, a light module 2A is described. The light module 2A is a modification example of the light module 2. Similarly to the light module 2, the light module 2A includes a reflective means 11, an optical amplifying means 12, a wavelength filter means 13, a partially reflective means 14, a branching means 15 and a light receiving means 16, a phase control means 17, a thermoelectric element 18, and a surveillance means 21 and a storage means 22 illustrated in FIG. 6.

Figure 9:
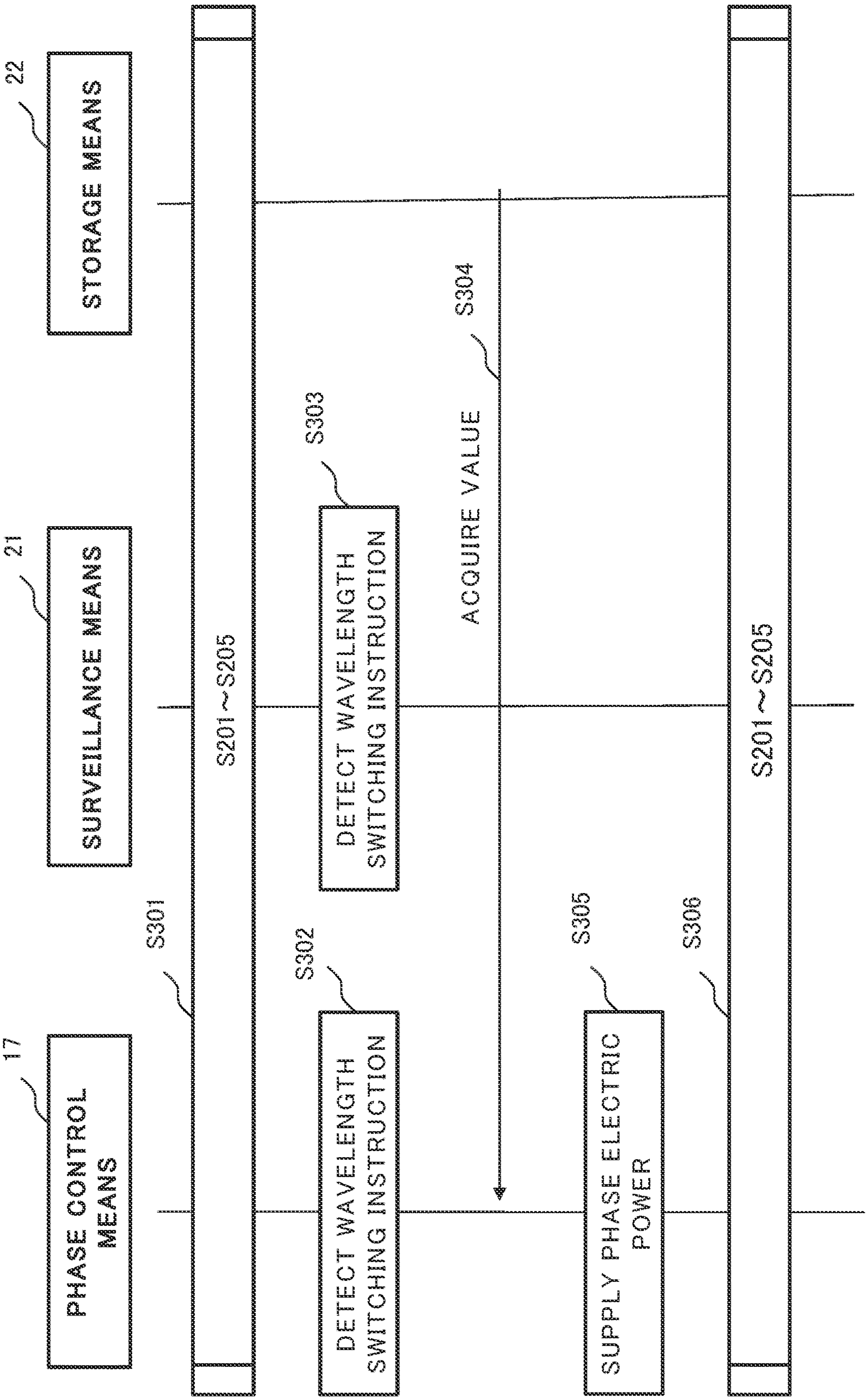
FIG. 9 is a flowchart illustrating a modification example of an operation of the light module according to the second example embodiment of the present invention.

The light module 2A is different from the light module 2 in an operation. FIG. 9 is a flowchart illustrating an operation of the light module 2A. The operation of the light module 2A is described by using FIG. 9.

It is assumed that the light module 2A repeats pieces of processing in S201 to S205 (S301). In processing in S301, the surveillance means 21 surveys phase electric power being supplied to the thermoelectric element 18 (S202). This allows the surveillance means 21 to acquire electric energy of phase electric power being supplied to the thermoelectric element 18 during a time when pieces of processing in S101 to S104 are repeated by the phase control means 17. Note that, it is assumed that the light output means 20 in the light module 2A outputs light of the first wavelength by transmitting light of the first wavelength through the wavelength filter means 13.

In S203 within S301, the surveillance means 21 computes each value, based on acquired electric energy. Specifically, the surveillance means 21 computes a maximum value, a minimum value, and an average value of electric energy of phase electric power acquired during a period when pieces of processing in S101 to S104 are performed. Further, in S204 within S301, the surveillance means 21 outputs a computation result to the storage means 22.

In S205 within S301, the storage means 22 stores a computation result. Specifically, the storage means 22 outputs an average value, a maximum value, and a minimum value of phase electric power. Specifically, the storage means 22 acquires, as new first electric energy, electric energy of electric power (phase electric power) to be supplied to the thermoelectric element 18 during a time when the phase control means 17 performs at least one of the first control and the second control.

Further, the storage means 22 updates each stored value, based on a computation result (new first electric energy). Update by the storage means 22 is described by using FIGS. 7 and 10. FIG. 7 illustrates a value before update, and FIG. 10 illustrates a value after update. It is assumed that, at a start point of time of an operation of the light module 2A, as illustrated in FIG. 7, a supply amount, an average value, a maximum value, and a minimum value of phase electric power associated with the first wavelength and the second wavelength are stored. In this case, the storage means 22 updates the value, based on a computation result (new first electric energy) output from the surveillance means 21. Specifically, when a value as illustrated in FIG. 7 is stored in advance in the storage means 22, it is assumed that values being an average value of 3.1 mw, a maximum value of 3.2 mw, and a minimum value of 3.0 nm associated with the first wavelength are stored from the surveillance means 21. In this case, as illustrated in FIG. 10, the storage means 22 updates the average value, the maximum value, and the minimum value associated with the first.

Further, the storage means 22 updates 3.1 mw being an average value, as a supply amount, from 3 mw. At this occasion, the storage means 31 computes 0.1 mw being a difference between 3 mw being a supply amount before update, and 3.1 mw being a new supply amount (new first electric energy). The storage means 31 updates the supply amount associated with the second wavelength to 5.1 by using 0.1 being the difference. Specifically, the storage means 22 updates the supply amount (second electric energy) associated with the second wavelength, based on a supply amount (first electric energy) before update and being associated with the first wavelength, and a supply amount (new first electric energy) after update and being associated with the first wavelength. The phase control means 17 detects a wavelength switching instruction (S301). Specifically, the phase control means 17 accepts a wavelength switching instruction of instructing to switch a wavelength of light to be output from the light output means 20 from the first wavelength to the second wavelength. The wavelength switching instruction is input from an external transmission device or a user to the phase control means 17 via an unillustrated interface.

After detecting the wavelength switching instruction, the light module 2A stops processing (S301) of repeating S201 to S205. At this occasion, the wavelength filter means 13 switches a wavelength of light to be transmitted from the first wavelength to the second wavelength.

Further, the surveillance means 21 detects the wavelength switching instruction similarly to the phase control means 17 (S302). The wavelength switching instruction is input from an external transmission device or a user to the surveillance means 21 via an unillustrated interface.

The phase control means 17 acquires a value stored in the storage means 22 (S303). Specifically, the phase control means 17 acquires the supply amount (second electric energy) associated with the second wavelength after update. The phase control means 17 supplies phase electric power according to the acquired supply amount (second electric energy) (S304). Thereafter, the light module 2A repeats pieces of processing in S201 to S205 (S305).

Generally, when a characteristic of the light output means 20 changes, appropriate phase electric power to be supplied to the thermoelectric element 18 also changes according to the change in the characteristic. As described above, in the light module 2A, a supply amount for the second wavelength is updated by using a change amount of a supply amount for the first wavelength. Therefore, in the light module 2A, updating a supply amount associated with the second wavelength, based on a change in a characteristic of the light output means 20 occurring during a time when light of the first wavelength is output enables to supply appropriate phase electric power, when light of the second wavelength is output.

Third Example Embodiment

Figure 11:
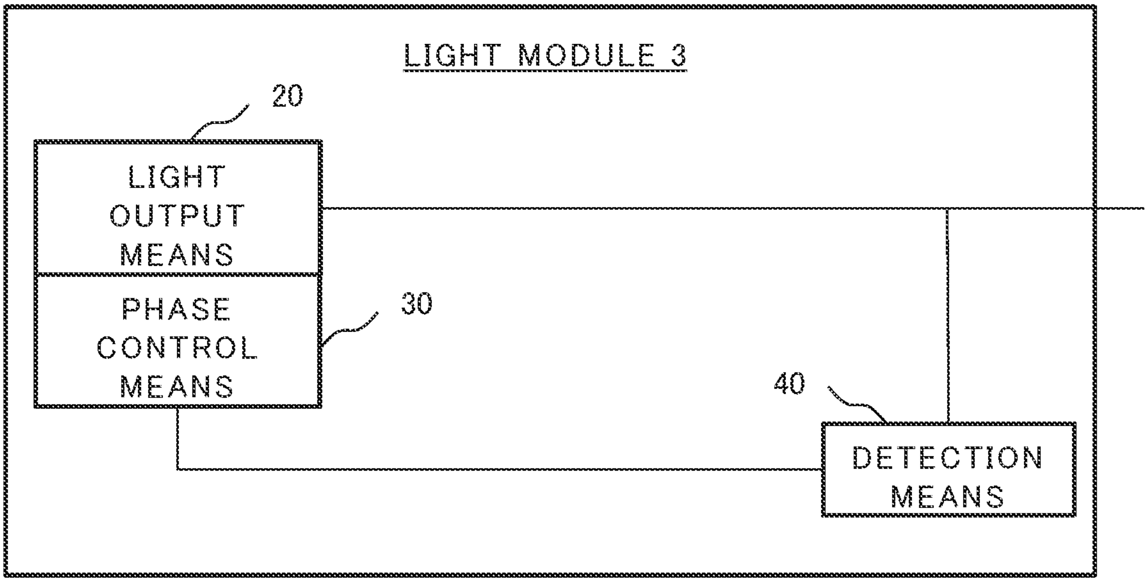
FIG. 11 is a block diagram illustrating a configuration example of a light module according to a third example embodiment of the present invention.
Figure 12:
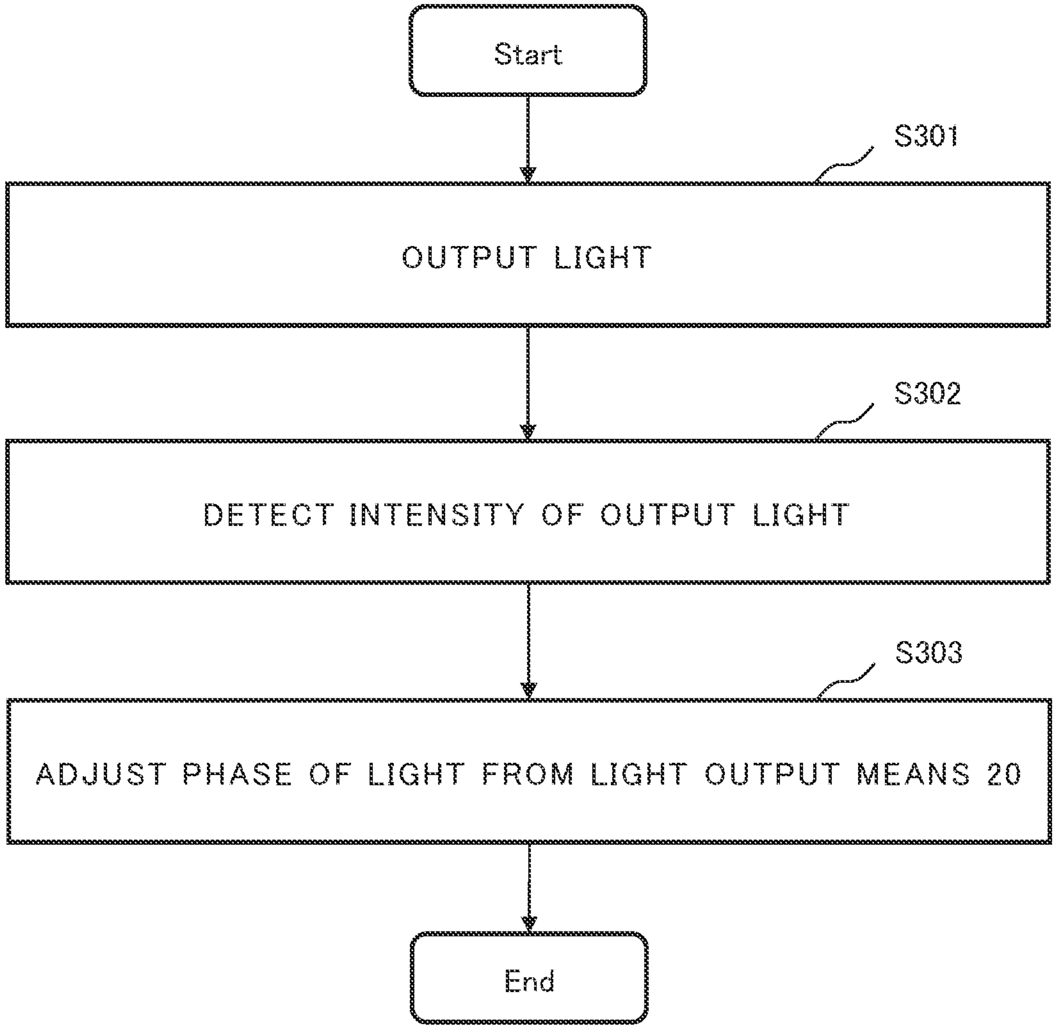
FIG. 12 is a flowchart illustrating an operation example of the light module according to the third example embodiment of the present invention.

A light module 3 according to a third example embodiment is described by using FIGS. 11 and 12. FIG. 11 is a block diagram illustrating a configuration example of the light module 3. FIG. 12 is a flowchart illustrating an operation example of the light module 3.

As illustrated in FIG. 11, the light module 3 includes a light output means 20, a phase control means 30, and a detection means 40. Note that, the light output means 20 of the light module 3 may include a configuration, a connection relationship, and a function similar to those of the light output means 20 described in each of the first example embodiment and the second example embodiment. Further, the phase control means 30 of the light module 3 may include a configuration, a connection relationship, and a function similar to those of the phase control means 17 described in each of the first example embodiment and the second example embodiment. Further, the detection means 40 of the light module 3 may include a configuration, a connection relationship, and a function similar to those of the light receiving means 16 described in each of the first example embodiment and the second example embodiment.

The light output means 20 outputs light. The phase control means 30 adjusts a phase of the light output from the light output means 20. The detection means 40 detects intensity of the light in which the phase is adjusted.

Next, an operation of the light module 3 is described by using FIG. 12. The light output means 20 outputs light (S301). The detection means 40 detects intensity of the output light (S302). The phase control means 30 adjusts a phase of the light from the light output means 20 (S303). Note that, the phase control means 30 adjusts a phase of light, for example, by supplying electric current to a thermoelectric element provided near a waveguide through which light to be output from the light output means 20 propagates. Further, the example embodiment is not limited thereto, and the phase control means 30 may control a diffractive index of a waveguide by injecting electric current to a part of the waveguide.

As described above, also in the light module 3, the phase control means 30 adjusts a phase of light, based on intensity of light detected by the detection means 40. Therefore, also in the light module 3, since it is not necessary to adjust a phase of light by using a dither signal, a phase of light can be adjusted with a simple configuration.

Figure 13:
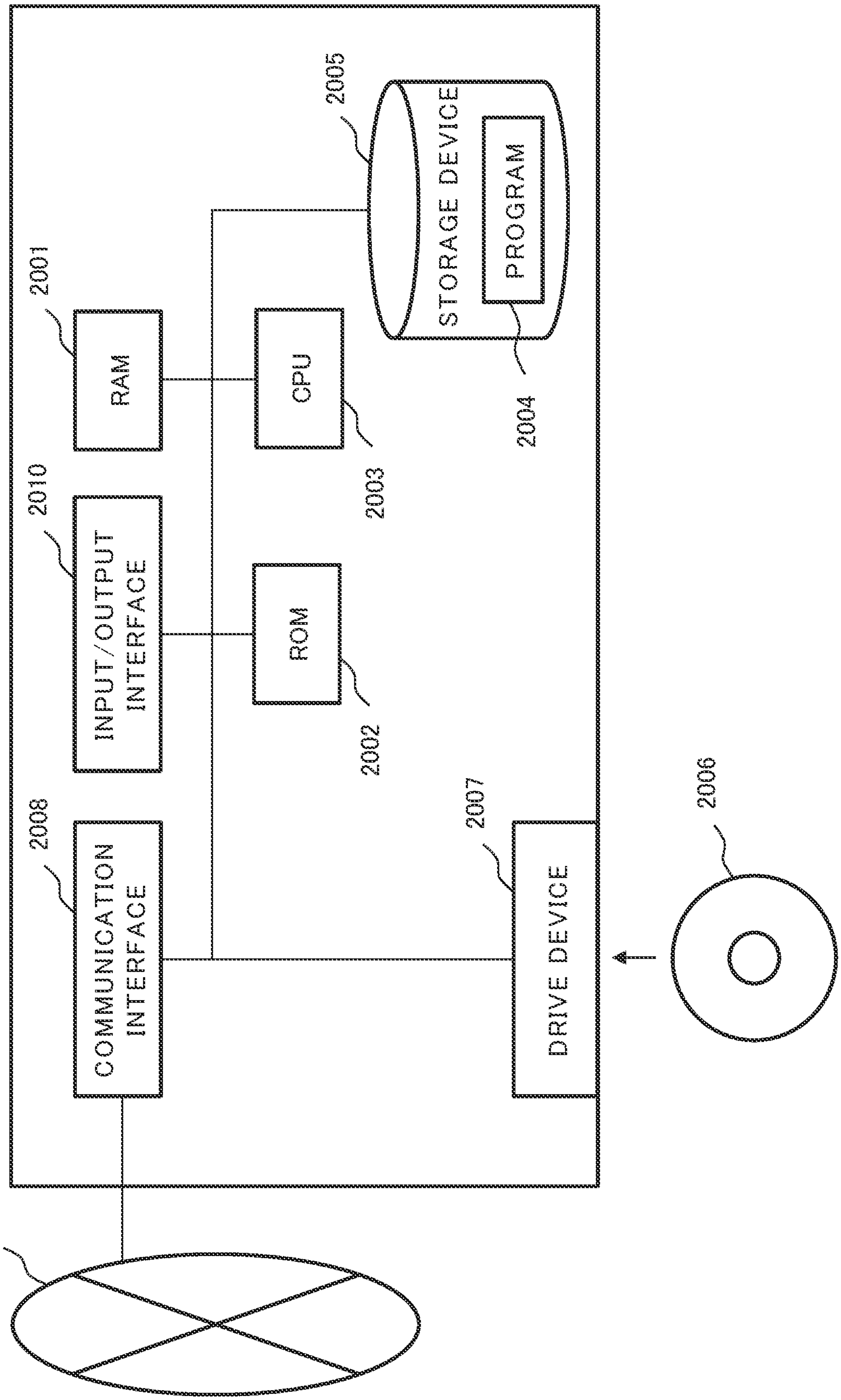
FIG. 13 is a diagram illustrating one example of an information processing device for achieving the light modules and the like according to the first example embodiment, the second example embodiment, and the third example embodiment of the present invention.

Further, a part or all of each constituent element of each light module is achieved, for example, by any combination of an information processing device 2000 as illustrated in FIG. 13, and a program. FIG. 13 is a diagram illustrating one example of an information processing device for achieving each light module. The information processing device 2000 includes, as one example, a configuration as described below.

- A central processing unit (CPU) 2001
- a read only memory (ROM) 2002
- a random access memory (RAM) 2003
- a program 2004 to be loaded on the RAM 2003
- a storage device 2005 for storing the program 2004
- a drive device 2007 for reading and writing to and from a recording medium 2006
- a communication interface 2008 to be connected to a communication network 2009
- an input/output interface 2010 for performing input and output of data, and
- a bus 2011 for connecting each constituent element Each constituent element of each device in each example embodiment is achieved by causing the CPU 2001 to acquire and execute the program 2004 for achieving these functions. The program 2004 for achieving a function of each constituent element of each device is, for example, stored in advance in the storage device 2005 or the RAM 2003, and is read by the CPU 2001 as necessary. Note that, the program 2004 may be supplied to the CPU 2001 via the communication network 2009, or stored in advance in the recording medium 2006, and the drive device 2007 may read the program and supply the program to the CPU 2001.

Various modification examples are available as a method of achieving each device. For example, each device may be achieved by any combination of each individual information processing device 2000 and a program for each constituent element. Further, a plurality of constituent elements included in each device may be achieved by any combination of one information processing device 2000 and a program.

Further, a part or all of each constituent element of each device is achieved by general-purpose or dedicated circuitry including a processor and the like, or combination of these. These may be constituted of a single chip, or may be constituted of a plurality of chips to be connected via a bus. A part or all of each constituent element of each device may be achieved by combination of the above-described circuitry and the like, and a program.

When a part or all of each constituent element of each device is achieved by a plurality of information processing devices, circuitry, and the like, the plurality of information processing devices, the circuitry, and the like may be concentratedly disposed or distributively disposed. For example, an information processing device, circuitry, and the like may be achieved as a configuration in which each of a client-and-server system, a cloud computing system, and the like is connected via a communication network.

A part or all of the above-described example embodiments may also be described as the following supplementary notes, but is not limited to the following.

Supplementary Note 1

A light module comprising:

a light output means for outputting light;

a phase control means for adjusting a phase of the light; and a detection means for detecting intensity of the light, wherein the phase control means adjusts a phase of the light, based on the intensity.

Supplementary Note 2

The light module according to claim 1, further comprising a thermoelectric element being thermally connected to a waveguide through which the light propagates, wherein the phase control means adjusts a phase of the light by adjusting electric power to be supplied to the thermoelectric element.

Supplementary Note 3

The light module according to claim 2, wherein the phase control means is executable of first control of raising a temperature of the thermoelectric element, and second control of lowering a temperature of the thermoelectric element, and performs, when the intensity is decreased during a time when one of the first control and the second control is performed, another of the first control and the second control.

Supplementary Note 4

The light module according to claim 3, wherein the phase control means performs the first control by increasing electric power to be supplied to the thermoelectric element, and performs the second control by decreasing electric power to be supplied to the thermoelectric element.

Supplementary Note 5

The light module according to any one of claim 3 or 4, further comprising a surveillance means for surveying electric energy of the electric power to be supplied to the thermoelectric element during a time when the phase control means performs at least one of the first control and the second control.

Supplementary Note 6

The light module according to claim 5, wherein the surveillance means acquires the electric energy in association with a wavelength of the light to be output from the light output means.

Supplementary Note 7

The light module according to claim 6, further comprising a storage means for storing first electric energy associated with a first wavelength, and second electric energy associated with a second wavelength, wherein the surveillance means acquires, as new first electric energy, electric energy of the electric power to be supplied to the thermoelectric element during a time when the phase control means performs at least one of the first control and the second control in association with the first wavelength of the light to be output from the light output means, and the storage means updates second electric energy, based on the first electric energy and the new first electric energy.

Supplementary Note 8

The light module according to any one of claims 1 to 7, wherein the light output means comprises an optical amplifying means for outputting spontaneous radiation amplified light, a reflective means for reflecting the spontaneous radiation amplified light being output from the optical amplifying means, a wavelength filter means for transmitting only light of a part of wavelengths among the spontaneous radiation amplified light, and a partially reflective means for transmitting part of light from the wavelength filter means, outputting the part of light toward the detection means, as the light to be output from the light output means, and reflecting other part of light from the wavelength filter means.

Supplementary Note 9

A light system comprising:

a light output means for outputting light;

a phase control means for adjusting a phase of the light; and a detection means for detecting intensity of the light, wherein the phase control means adjusts a phase of the light, based on the intensity.

Supplementary Note 10

A light output method comprising:

outputting light;

detecting intensity of the light; and adjusting a phase of the light, based on the intensity.

While the invention has been particularly shown and described with reference to exemplary embodiments thereof, the invention is not limited to these embodiments. It will be understood by those of ordinary skill in the art that various changes in form and details may be made therein without departing from the spirt and scope of the present invention as defined by the claims.

REFERENCE SIGNS LIST

1, 1A, 1B, 1C, 2, 2A Light module
11 Reflective means
12 Optical amplifying means
13 Wavelength filter means
14 Partially reflective means
15 Branching means
16 Light receiving means
17 Phase control means
18 Thermoelectric element
19 Wavelength filter means
20 Light output means
21 Surveillance means
22 Storage means
2001 CPU
2002 ROM
2003 RAM
2004 Program
2005 Storage device
2007 Drive device
2008 Communication interface
2009 Communication network
2010 Input/output interface
2011 Bus for connecting constituent elements

What is claimed is:

1. A light module comprising:

light output circuit configured to output light;

phase control circuit configured to adjust a phase of the light;

detection circuit configured to detect intensity of the light; and a thermoelectric element being thermally connected to a waveguide through which the light propagates, wherein the phase control circuit adjusts a phase of the light, based on the intensity, by adjusting electric power to be supplied to the thermoelectric element.

2. The light module according to claim 1, wherein the phase control circuit is executable of first control of raising a temperature of the thermoelectric element, and second control of lowering a temperature of the thermoelectric element, and performs, when the intensity is decreased during a time when one of the first control and the second control is performed, another of the first control and the second control.

3. The light module according to claim 2, wherein the phase control circuit performs the first control by increasing electric power to be supplied to the thermoelectric element, and performs the second control by decreasing electric power to be supplied to the thermoelectric element.

4. The light module according to claim 2, further comprising surveillance circuit configured to survey electric energy of the electric power to be supplied to the thermoelectric element during a time when the phase control circuit performs at least one of the first control and the second control.

5. The light module according to claim 4, wherein the surveillance circuit acquires the electric energy in association with a wavelength of the light to be output from the light output circuit.

6. The light module according to claim 5, further comprising storage circuit configured to store first electric energy associated with a first wavelength, and second electric energy associated with a second wavelength, wherein the surveillance circuit acquires, as new first electric energy, electric energy of the electric power to be supplied to the thermoelectric element during a time when the phase control circuit performs at least one of the first control and the second control in association with the first wavelength of the light to be output from the light output circuit, and the storage circuit updates the second electric energy, based on the first electric energy and the new first electric energy.

7. The light module according to claim 1, wherein the light output circuit comprises optical amplifying circuit configured to output spontaneous radiation amplified light, reflective circuit configured to reflect the spontaneous radiation amplified light being output from the optical amplifying circuit, wavelength filter circuit configured to transmit only light of a part of wavelengths among the spontaneous radiation amplified light, and partially reflective circuit configured to transmit part of light from the wavelength filter circuit, outputting the part of light toward the detection circuit, as the light to be output from the light output circuit, and reflecting other part of light from the wavelength filter circuit.

8. A light system comprising:

light output circuit configured to output light;

phase control circuit configured to adjust a phase of the light;

detection circuit configured to detect intensity of the light; and a thermoelectric element being thermally connected to a waveguide through which the light propagates, wherein the phase control circuit adjusts a phase of the light, based on the intensity, by adjusting electric power to be supplied to the thermoelectric element.

9. A light output method comprising:

outputting light;

detecting intensity of the light; and adjusting a phase of the light, based on the intensity, wherein the adjusting of the phase of the light comprises adjusting electric power to be supplied to a thermoelectric element being thermally connected to a waveguide through which the light propagates.

10. The light system according to claim 8, wherein the phase control circuit is executable of first control of raising a temperature of the thermoelectric element, and second control of lowering a temperature of the thermoelectric element, and performs, when the intensity is decreased during a time when one of the first control and the second control is performed, another of the first control and the second control.

11. The light system according to claim 10, wherein the phase control circuit performs the first control by increasing electric power to be supplied to the thermoelectric element, and performs the second control by decreasing electric power to be supplied to the thermoelectric element.

12. The light system according to claim 10, further comprising surveillance circuit configured to survey electric energy of the electric power to be supplied to the thermoelectric element during a time when the phase control circuit performs at least one of the first control and the second control.

13. The light system according to claim 12, wherein the surveillance circuit acquires the electric energy in association with a wavelength of the light to be output from the light output circuit.

14. The light system according to claim 13, further comprising storage circuit configured to store first electric energy associated with a first wavelength, and second electric energy associated with a second wavelength, wherein the surveillance circuit acquires, as new first electric energy, electric energy of the electric power to be supplied to the thermoelectric element during a time when the phase control circuit performs at least one of the first control and the second control in association with the first wavelength of the light to be output from the light output circuit, and the storage circuit updates the second electric energy, based on the first electric energy and the new first electric energy.

15. The light system according to claim 8, wherein the light output circuit comprises optical amplifying circuit configured to output spontaneous radiation amplified light, reflective circuit configured to reflect the spontaneous radiation amplified light being output from the optical amplifying circuit, wavelength filter circuit configured to transmit only light of a part of wavelengths among the spontaneous radiation amplified light, and partially reflective circuit configured to transmit part of light from the wavelength filter circuit, outputting the part of light toward the detection circuit, as the light to be output from the light output circuit, and reflecting other part of light from the wavelength filter circuit.

* * * * *